United States Patent
Saito

(10) Patent No.: US 9,030,684 B2
(45) Date of Patent: May 12, 2015

(54) IMAGE FORMING APPARATUS, CONTROL METHOD OF IMAGE FORMING APPARATUS, AND STORAGE MEDIUM

(71) Applicant: Canon Kabushiki Kaisha, Tokyo (JP)

(72) Inventor: Megumi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/887,193

(22) Filed: May 3, 2013

(65) Prior Publication Data

US 2013/0293912 A1 Nov. 7, 2013

(30) Foreign Application Priority Data

May 7, 2012 (JP) ................................ 2012-106119

(51) Int. Cl.
*G06F 3/12* (2006.01)
*H04N 1/04* (2006.01)
*H04N 1/00* (2006.01)
*H04N 1/23* (2006.01)

(52) U.S. Cl.
CPC ....... *H04N 1/00925* (2013.01); *H04N 1/00596* (2013.01); *H04N 1/2323* (2013.01); *H04N 1/2376* (2013.01); *H04N 1/2392* (2013.01); *H04N 2201/0091* (2013.01)

(58) Field of Classification Search
CPC .......... H04N 1/00925; H04N 1/00596; H04N 1/2376; H04N 1/2392; H04N 1/2323; H04N 2201/0091
USPC ................................ 358/1.13, 1.15, 493, 496
See application file for complete search history.

(56) References Cited

U.S. PATENT DOCUMENTS

| | | | | |
|---|---|---|---|---|
| 5,130,757 A | * | 7/1992 | Ito | 399/14 |
| 5,557,427 A | * | 9/1996 | Kamiya | 358/496 |
| 5,721,627 A | * | 2/1998 | Kamiya | 358/496 |
| 6,655,676 B2 | * | 12/2003 | Nishimura | 271/9.05 |
| 2006/0228142 A1 | * | 10/2006 | Meyerhofer et al. | 400/82 |
| 2013/0293930 A1 | * | 11/2013 | Araki et al. | 358/3.24 |

FOREIGN PATENT DOCUMENTS

JP 2000-185881 A 7/2000

* cited by examiner

*Primary Examiner* — Fred Guillermety
*Assistant Examiner* — Walter Yehl
(74) *Attorney, Agent, or Firm* — Canon U.S.A., Inc., IP Division

(57) ABSTRACT

An image forming apparatus and method for reading an image of a document and preventing an image from being printed on the document if a sheet type of the document is not suitable for printing. The method includes reading an image of a conveyed document, detecting a sheet type of the conveyed document, and controlling, in a case where the detected sheet type is the predetermined sheet type, an image to be printed on the conveyed document, and controlling, in a case where the detected sheet type is not a predetermined sheet type, an image not to be printed on the conveyed document.

10 Claims, 16 Drawing Sheets

FIG.11

PRINTING IS CANCELED BECAUSE
PAPER CANNOT BE PRINTED.

IMAGE FORMING APPARATUS, CONTROL METHOD OF IMAGE FORMING APPARATUS, AND STORAGE MEDIUM

BACKGROUND

1. Field of the Invention

Aspects of the present invention generally relate to an image forming apparatus, a control method of the image forming apparatus, and a storage medium.

2. Description of the Related Art

Conventionally, there is provided an image forming apparatus including an image reading unit for reading an image of a document conveyed thereto, and a printing unit for printing an image on a recording paper. Further, there is also provided an image forming apparatus whose size is reduced by making a part of a conveyance path for conveying a document and a part of a conveyance path for conveying a recording paper be common to each other (see, Japanese Patent Application Laid-Open No. 2000-185881). When a document image is read, and an image is printed on that document, the image is printed on the document even if a paper type of the document is not suitable for printing. For example, if the paper type of the document is a thermal paper that changes in shade due to heat, even though the document image can be read properly, when an image is printed on the document, the document turns black due to heat at the time of printing, and thus the content of the document will be lost.

SUMMARY

According to an aspect of the present invention, an image forming apparatus includes a conveying unit configured to convey a document, a reading unit configured to read the document, a detecting unit configured to detect a sheet type of the document, and a printing unit configured, in a case where a detected sheet type is not a predetermined sheet type, to print an image on the document, and in a case where a detected sheet type is a predetermined sheet type, not to print an image on the document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a diagram illustrating an example of a screen displayed on an operation unit of the image forming apparatus according to an exemplary embodiment.

DESCRIPTION OF THE EMBODIMENTS

Various exemplary embodiments, features, and aspects of the invention will be described in detail below with reference to the drawings.

A first exemplary embodiment will be described.

In the present exemplary embodiment, an image forming apparatus will be described.

Figure 1:
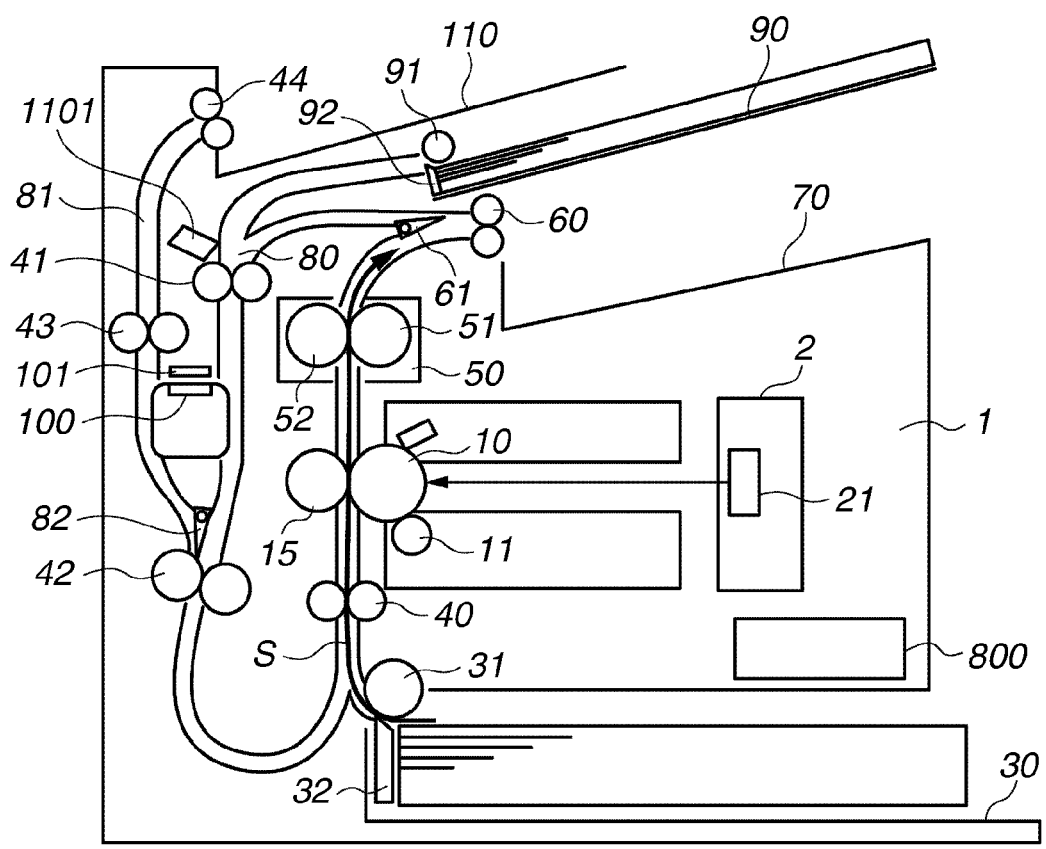
FIG. 1 is a diagram illustrating a cross-sectional view of an image forming apparatus according to an exemplary embodiment.

FIG. 1 is a diagram illustrating a cross-sectional view of an image forming apparatus 1 that is one example of a printing apparatus according to the present exemplary embodiment.

A photosensitive drum 10 and a developing roller 11 are arranged within the image forming apparatus 1. The photosensitive drum 10 is a rotatable image bearing member. The developing roller 11 is arranged in juxtaposition to the photosensitive drum 10, and rotates while holding toner. When an optical unit 2 receives a printing signal, a light emitting unit 21 irradiates a surface of the rotating photosensitive drum 10 with laser light. A latent image caused by an electric charge is formed on the surface of the photosensitive drum 10 irradiated with the laser light. When the developing roller 11 rotates and supplies toner onto the latent image formed on the surface of the photosensitive drum 10, a toner image is formed on the surface of the photosensitive drum 10.

A first paper feeding unit 30 stores a recording material such as a sheet of paper (also referred to as "sheet" or "recording paper"). A recording material S stored in the first paper feeding unit 30 is conveyed one-by-one to a conveyance roller 40 by a cassette (CST) pickup roller 31 and a separation unit 32. In FIG. 1, an arrow in a bold line indicates the recording material S. The conveyance roller 40 conveys the recording material S to a transfer unit 15 while adjusting the timing so as to cause a leading end of the toner image formed on the surface of the photosensitive drum 10 to match with a leading end of the recording material S.

The toner image is conveyed by the rotation of the photosensitive drum 10 and transferred to the recording material S by applied bias and pressure applied to the transfer unit 15. The transfer unit 15 conveys the recording material S to a fixing unit 50. In the fixing unit 50, a rotatable heating roller 51 and a rotatable pressure roller 52 are opposed to each other, and the toner image is fixed to the recording material S by the heat from the heating roller 51 and the pressure from the pressure roller 52. The recording material S to which the toner image has been fixed is conveyed to a discharge roller 60. In a case where one-sided printing is performed, the paper discharge roller 60 conveys the recording material S to the exterior, so that the recording material S is stacked on a first paper discharge unit 70.

Figure 2:
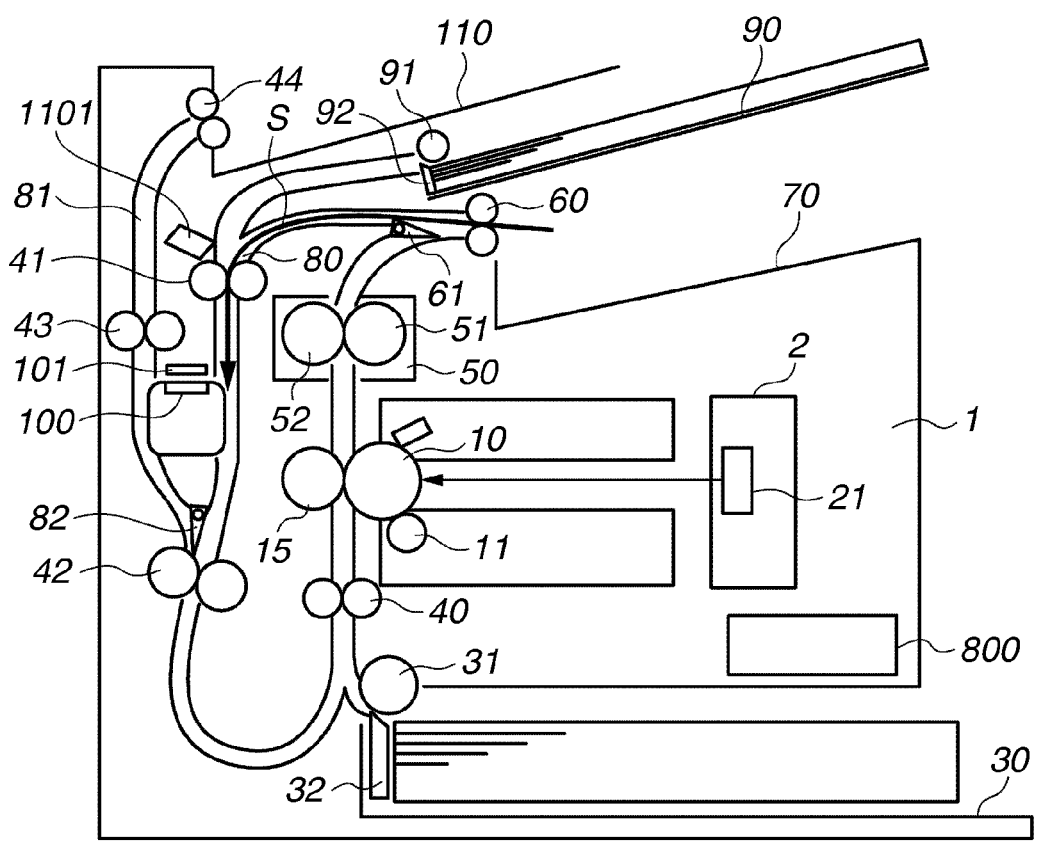
FIG. 2 is a diagram illustrating two-sided printing processing in the image forming apparatus according to an exemplary embodiment.

FIG. 2 is a diagram illustrating two-sided printing processing. After a trailing end of the recording material S passes through a two-sided flapper 61, the two-sided flapper 61 switches a conveyance path. Thereafter, the paper discharge roller 60 starts rotating in the reverse direction, and conveys the recording material S to a two-sided conveyance path 80. The recording material S is conveyed to an image reading unit 100 by the conveyance roller 41. Then, the recording material S is conveyed to the transfer unit 15 again by the conveyance roller 42 and the conveyance roller 40. After the toner image is transferred and fixed to the recording material S, the recording material S on which the two-sided printing has been performed is stacked on the first paper discharge unit 70.

Next, with reference to FIGS. 3 through 7, an operation of two-sided copy for printing images of a two-sided document on two sides of a recording material will be described.

Figure 3:
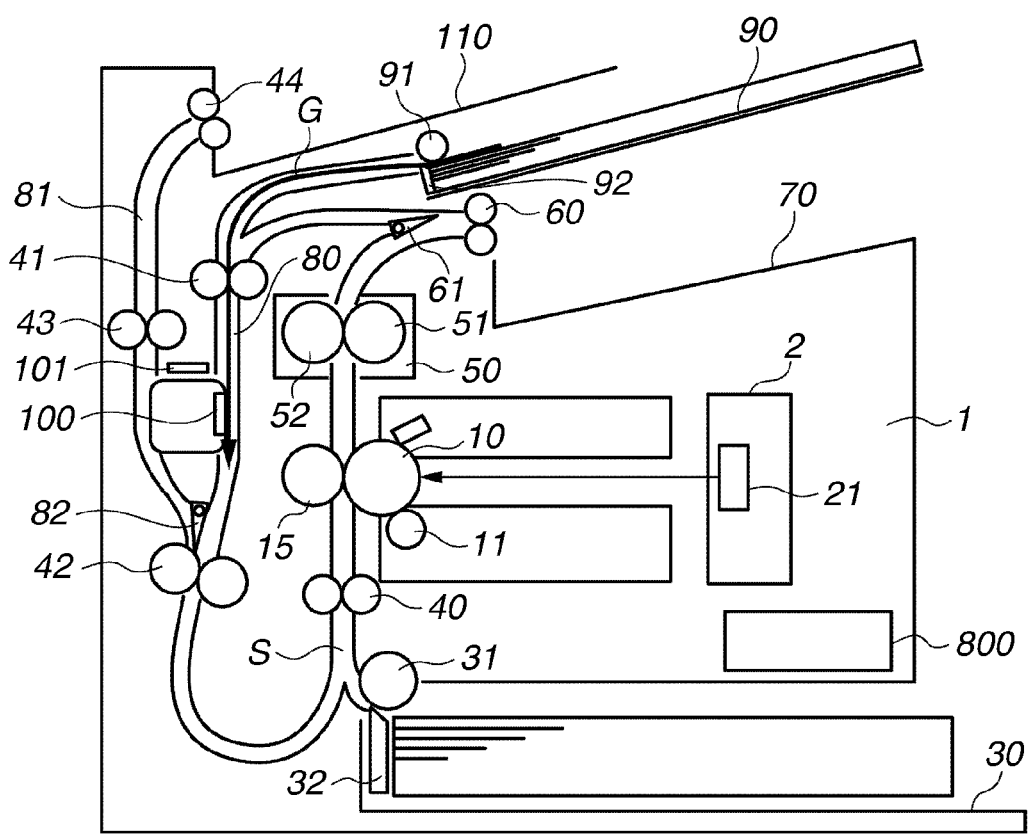
FIG. 3 is a diagram illustrating reading processing of a first side of a document in the image forming apparatus according an exemplary embodiment.

FIG. 3 is a diagram illustrating reading processing of a first side of the document. In FIG. 3, an arrow in a bold line indicates a document G. The document G stored in a second paper feeding unit 90 is conveyed one-by-one to the conveyance roller 41 by a contact image sensor (CIS) pickup roller 91 and a separation unit 92. A media sensor 1101 for detecting a paper type is disposed on the front side of the conveyance roller 41, so that the media sensor 1101 detects a type of the paper conveyed thereto. A known technique may be employed for the media sensor 1101 to detect the paper type. The image reading unit 100 emits light to a white reference member 101 to correct a white reference value before start reading the first side of the document G. Then, the image reading unit 100 rotates to a position facing to the two-sided conveyance path 80. The conveyance roller 41 conveys the document G to the image reading unit 100. The image reading unit 100, that is ready at the position facing the two-sided conveyance path 80, reads the first side of the document G, and the read image information is stored in an image memory as the image information of the first side of the document G. In consideration of adhesion of dust, the white reference member 101 is arranged in a downward direction.

Figure 4:
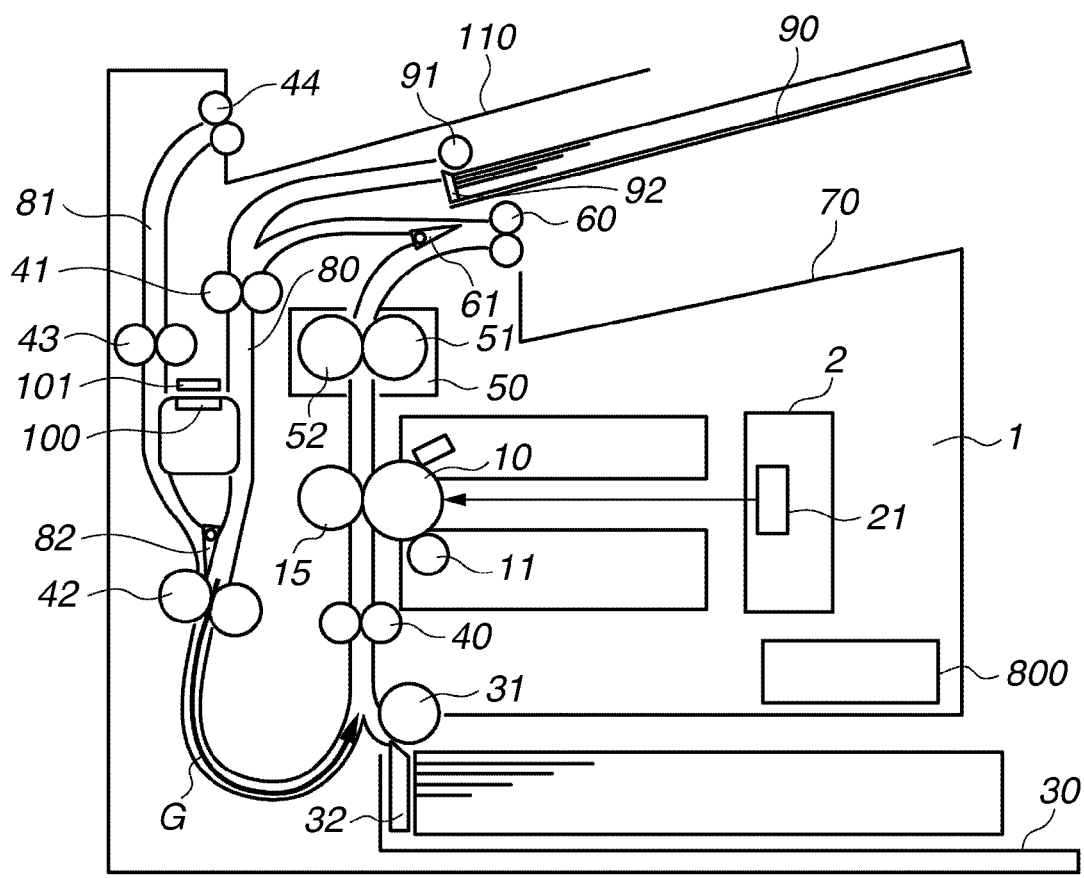
FIG. 4 is a diagram illustrating a state at the time of completion of the reading processing of the first side of the document in the image forming apparatus according to an exemplary embodiment.

FIG. 4 is a diagram illustrating a state at a time of completion of the reading processing for the first side of the document G. The document G that has passed through the image reading unit 100 is conveyed to the conveyance roller 42. The conveyance roller 42 stops when the trailing end of the document G has passed a switchback flapper 82. At this time, the document G stops in a state in which the conveyance roller 42 pinches the document G. After a predetermined period of time has elapsed, the conveyance roller 42 conveys the document G to a document conveyance path 81. During this predetermined period of time, the switchback flapper 82 switches the conveyance path from the two-sided conveyance path 80 to the document conveyance path 81.

Figure 5:
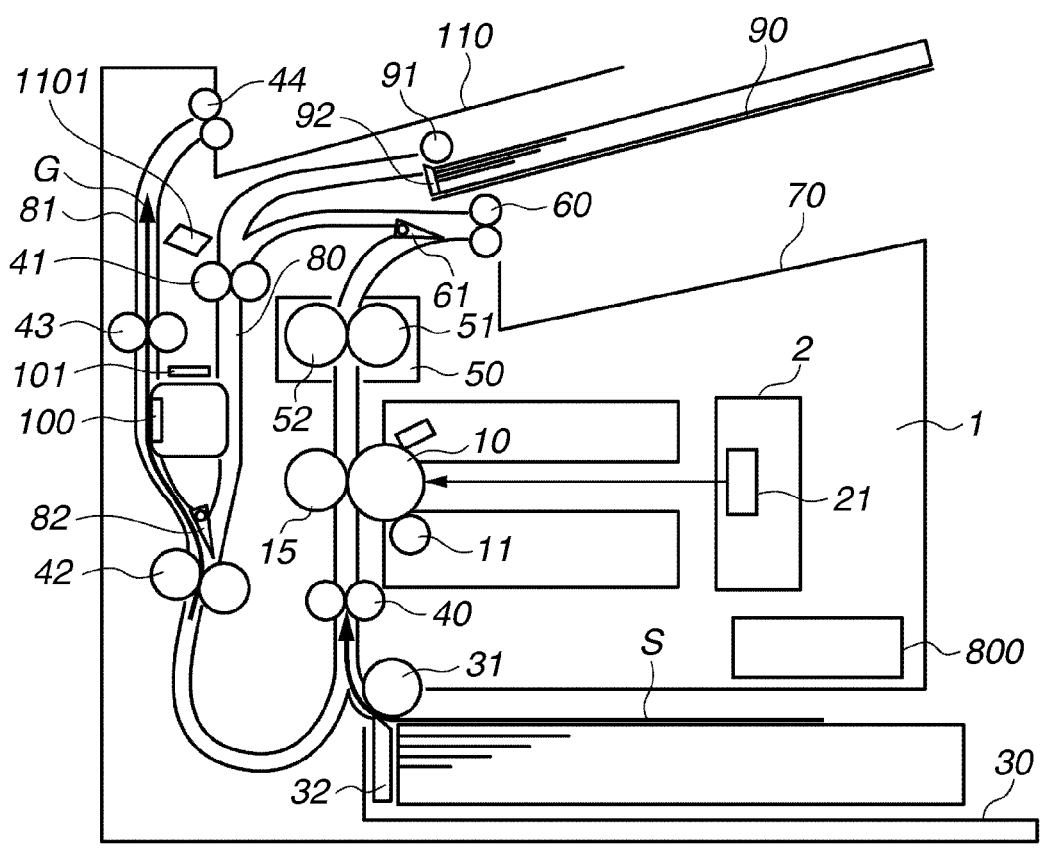
FIG. 5 is a diagram illustrating reading processing of a second side of the document in the image forming apparatus according to an exemplary embodiment.

FIG. 5 is a diagram illustrating reading processing of the second side of the document G. At the same time as the switchback flapper 82 switches the conveyance path of the document G from the two-sided conveyance path 80 to the document conveyance path 81, the image reading unit 100 rotates to a position facing the document conveyance path 81. The conveyance roller 42 starts rotating in the reverse direction and conveys the document G to the image reading unit 100 via the document conveyance path 81. When the document G passes through the image reading unit 100, the image reading unit 100 reads the second side of the document G, and the read image information is stored in the image memory as the image information of the second side of the document G. In a case where one-sided reading processing is specified, the reading processing of the image information on the second side thereof will not be executed.

On the other hand, a recording material S stored in the first paper feeding unit 30 is conveyed one-by-one to the conveyance roller 40. Almost at the same time, based on the image information of the second side of the document G stored in the image memory, the light emitting unit 21 irradiates the surface of the photosensitive drum 10 with laser light, and a latent image based on the image information of the second side of the document G is formed on the surface of the photosensitive drum 10. The transfer unit 15 transfers a toner image formed by the latent image to the recording material S, and the fixing unit 50 fixes the toner image to the recording material S. Through this, image formation based on the image information of the second side of the document G is completed. In FIG. 5, conveyance of the recording material S is started at the same time as the reading processing of the second side of the document G is started. However, conveyance of the recording material S may be started after executing the reading processing of the second side of the document G.

Figure 6:
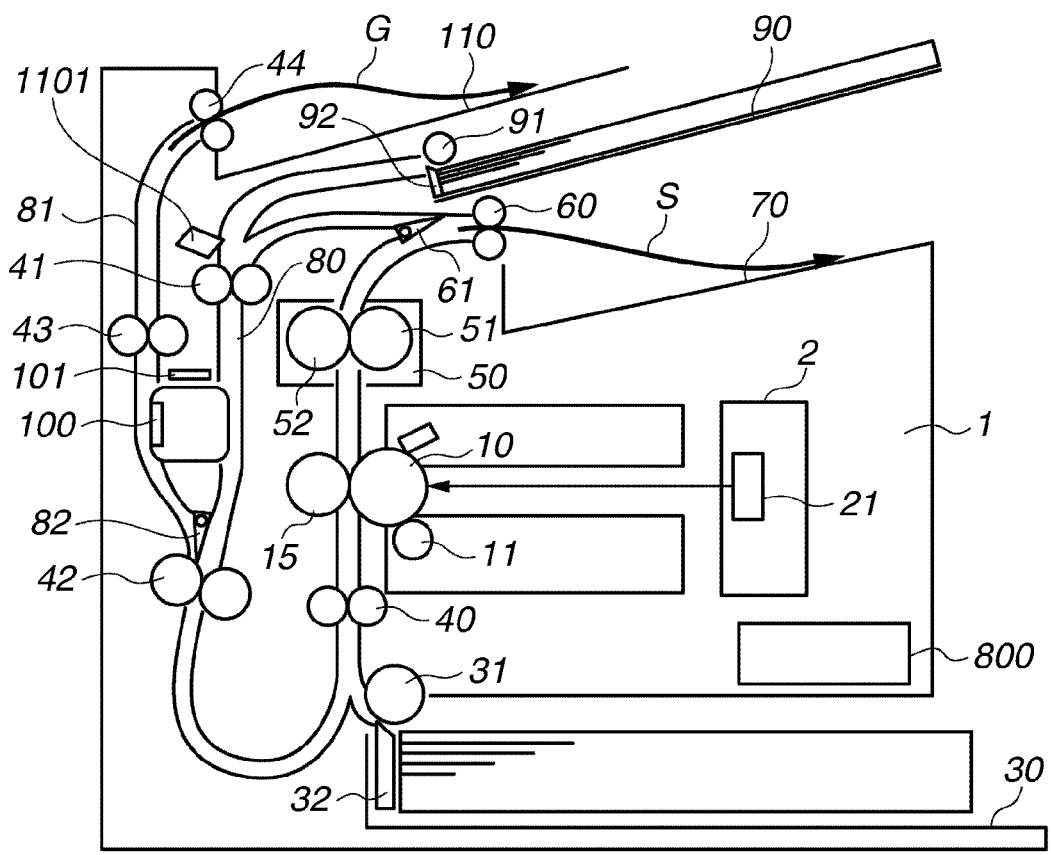
FIG. 6 is a diagram illustrating a state at the time of completion of the reading processing of the second side of the document in the image forming apparatus according to an exemplary embodiment.

FIG. 6 is a diagram illustrating a state at the time of completion of the reading processing of the second side of the document G. The document G is conveyed to the exterior by the conveyance roller 43 and the conveyance roller 44, and stacked on a second paper discharge unit 110. When the trailing end of the document G passes through the switchback flapper 82, the switchback flapper 82 switches the conveyance path from the document conveyance path 81 to the two-sided conveyance path 80 so that the recording material S is conveyed to the conveyance roller 40.

Figure 7:
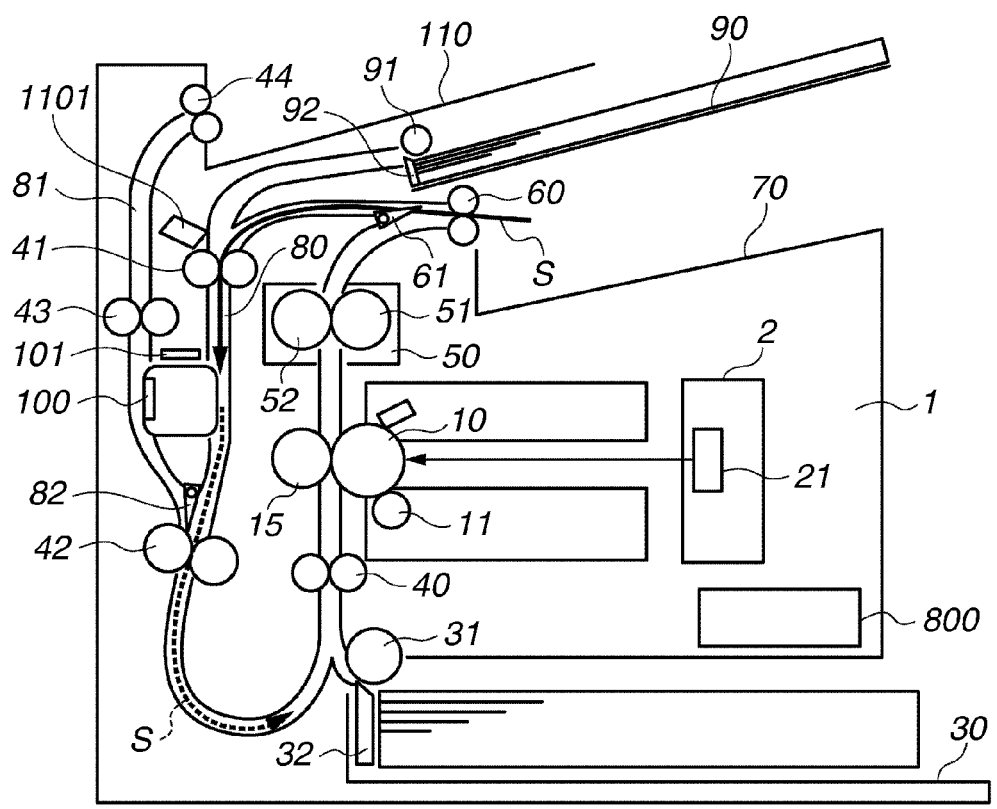
FIG. 7 is a diagram illustrating image formation based on image information of the first side of the document in the image forming apparatus according to an exemplary embodiment.

FIG. 7 is a diagram illustrating image formation based on the image information of the first side of the document. After the trailing end of the recording material S passes through the two-sided flapper 61, the two-sided flapper 61 switches the conveyance path. Thereafter, the discharge roller 60 starts rotating in the reverse direction, and conveys the recording material S to the two-sided conveyance path 80. The recording material S conveyed to the two-sided conveyance path 80 passes through the image reading unit 100. Then, the recording material S is conveyed to the conveyance roller 40 by the conveyance roller 42, and conveyed to the transfer unit 15 by the conveyance roller 40. In FIG. 7, an arrow in a dotted line illustrates the above described state. The light emitting unit 21 irradiates the surface of the photosensitive drum 10 with laser light based on the image information of the first side of the document G stored in the image memory, so that a latent image based on the image information of the first side of the document G is formed on the surface of the photosensitive drum 10. The transfer unit 15 transfers a toner image formed by the latent image to the recording material S, and the fixing unit 50 fixes the toner image to the recording material S. Through this, the image formation based on the image information of the first side of the document G is completed. Thereafter, the recording material S is stacked on the first paper discharge unit 70.

Figure 8:
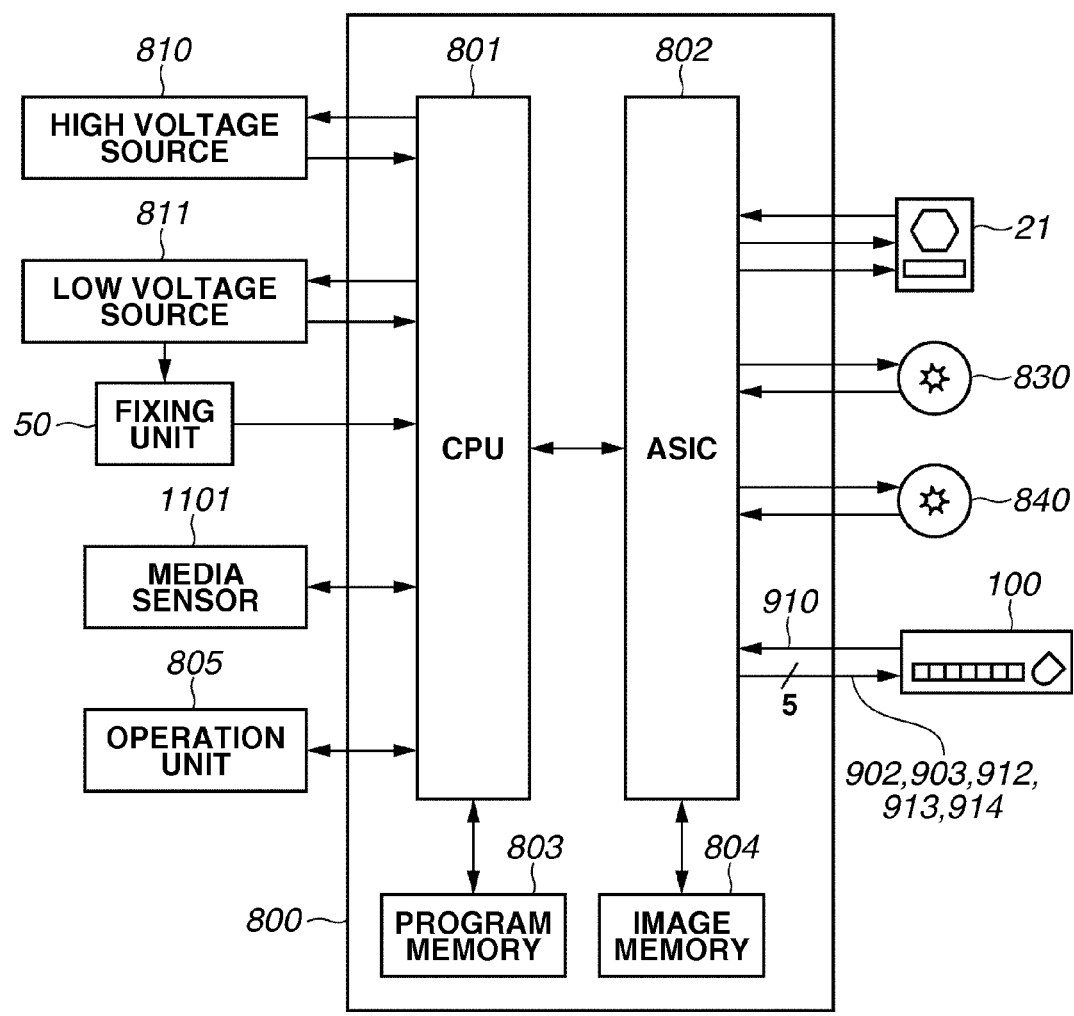
FIG. 8 is a block diagram illustrating electric devices of an image forming apparatus in the image forming apparatus according to an exemplary embodiment.

FIG. 8 is a block diagram illustrating electric devices 800 of the image forming apparatus 1. Each unit controlled by a control central processing unit (CPU) 801 (hereinafter, referred to as "CPU 801") is illustrated in FIG. 8.

The CPU 801 is connected to the light emitting element 21 including a polygon mirror, a motor, and a laser light emitting element via application specific integrated circuits (ASIC) 802. In order to form a desired latent image by scanning the surface of the photosensitive drum 10 with laser light, the CPU 801 transmits a control signal to the ASIC 802 to control the light emitting unit 21. Further, in order to convey the recording material S, the CPU 801 transmits a control signal to the ASIC 802 to control driving systems such as a main motor 830 and a two-sided driving motor 840. The main motor 830 drives the CST pickup roller 31, the conveyance roller 40, the photosensitive drum 10, the transfer unit 15, the heating roller 51, and the pressure roller 52. The two-sided driving motor 840 drives the CIS pickup roller 91 and the conveyance rollers 41 through 44.

Further, the CPU 801 controls a high voltage power source unit 810 and a low voltage source unit 811. The high voltage source unit 810 controls charging, development, and transfer while the low voltage power source unit 811 controls fixing, each of which is necessary for electro-photographic processing. In addition, the CPU 801 monitors temperatures through a thermistor (not illustrated) disposed on the fixing unit 50, and performs control processing for keeping a fixing temperature at a constant level.

The CPU 801 is connected to a program memory 803 via a bus. The program memory 803 is configured with a read only memory (ROM) and a random access memory (RAM), and stores program and data for all or a part of the processing executed by the CPU 801. In addition, the program memory 803 may also include a hard disk drive (HDD). Accordingly, the CPU 801 realizes each exemplary embodiment by executing the program and the data stored in the program memory 803.

An image memory 804 is configured with a RAM or a HDD, and stores an image read by the image reading unit 100.

Based on the instruction from the CPU 801, the ASIC 802 performs speed control of a motor within the light emitting unit 21, speed control of the main motor 830, and speed control of the two-sided driving motor 840. In the speed control of the motor, the ASIC 802 detects tack signals from the motor and transmits an acceleration signal or a deceleration signal to the motor to make an interval between the tack signals be a predetermined time. The tack signal is a pulse signal output from the motor every time the motor rotates. Using the ASIC 802 to configure a control circuit is advantageous in that a control load of the CPU 801 can be reduced.

The CPU 801 is also connected to the operation unit 805. The operation unit 805 includes a display unit such as a touch panel, and an operation key. The CPU 801 controls the operation unit 805 to display an operation screen and receives an instruction from a user via the operation unit 805.

Further, the CPU 801 is connected to the media sensor 1101. The information indicating a paper type detected by the media sensor 1101 is stored in the program memory 803 at each paper.

Figure 14:
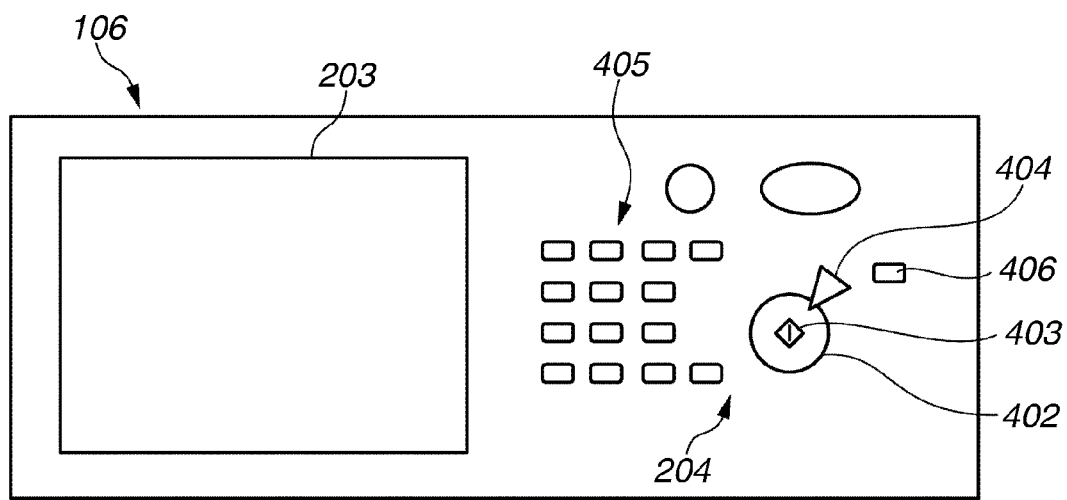
FIG. 14 is a diagram illustrating an example of the operation unit of the image forming apparatus according to an exemplary embodiment.

FIG. 14 is a diagram illustrating an example of the operation unit 805. A display unit 203 is configured with a liquid crystal display on which a sheet-form touch panel is affixed, and displays an operation screen and soft keys. When the soft key is pressed, the display unit 203 transmits to the CPU 801 positional information indicating a pressed position.

A keyboard 204 includes a numerical keypad 405, a stop key 404, a user mode key 406, and a start key 402. The numerical keypad 405 is a key for inputting numerals and letters, and used to set a copy number and switch a display screen. The stop key 404 is a key for stopping the ongoing operation. The user mode key 406 is a key for performing setting of the image forming apparatus 1. The start key 402 is a key for instructing start of image reading and printing.

A two-color light emitting diode (LED) 1403 is disposed at the center of the start key 1406. The LED 1403 in green color indicates that the start key 1406 can be used. The LED 1403 in red color indicates that the start key 1406 cannot be used.

In a case where the CPU 801 receives a copy instruction from the operation unit 805 or a print command from a host computer, the CPU 801 conveys the recording material S by driving the main motor 830 and the two-sided driving motor 840. A toner image formed on the surface of the photosensitive drum 10 is transferred to the recording material S by the transfer unit 15, and the toner image is fixed to the recording material S by the fixing unit 50. Thereafter, the recording material S is discharged to the first paper discharge unit 70. In order to enhance the alignment property of the recording material S on which the image has been formed, a shallow upward slope, starting from the vicinity of the discharge opening toward the area in the discharge direction of the recording material S, is provided on the first discharge unit 70. The CPU 801 controls the low voltage source unit 811 to supply a predetermined electric power to the fixing unit 50, so that the fixing unit 50 generates a predetermined amount of heat, supplies the heat to the recording material S, fuses the toner image on the recording material S, and fixes the toner image to the recording material S.

When the CPU 801 receives a copy instruction from the operation unit 805 or a scan command from the host computer, the CPU 801 drives the two-sided driving motor 840. The CIS pickup roller 91, to which torque of the two-sided diving motor is transmitted, conveys the document. The image reading unit 100 is connected to the ASIC 802 via signal lines 902, 903, 910, 912, 913, and 914. According to the instruction from the CPU 801, the ASIC 802 controls the image reading unit 100 to store the image information read by the image reading unit 100 in the image memory 804. Thereafter, the CPU 801 tilts the switchback flapper 82 toward the side of the two-sided conveyance path 80, rotates the two-sided driving motor 840 in the reverse direction, and conveys the document to the second discharge unit 110.

Figure 9:
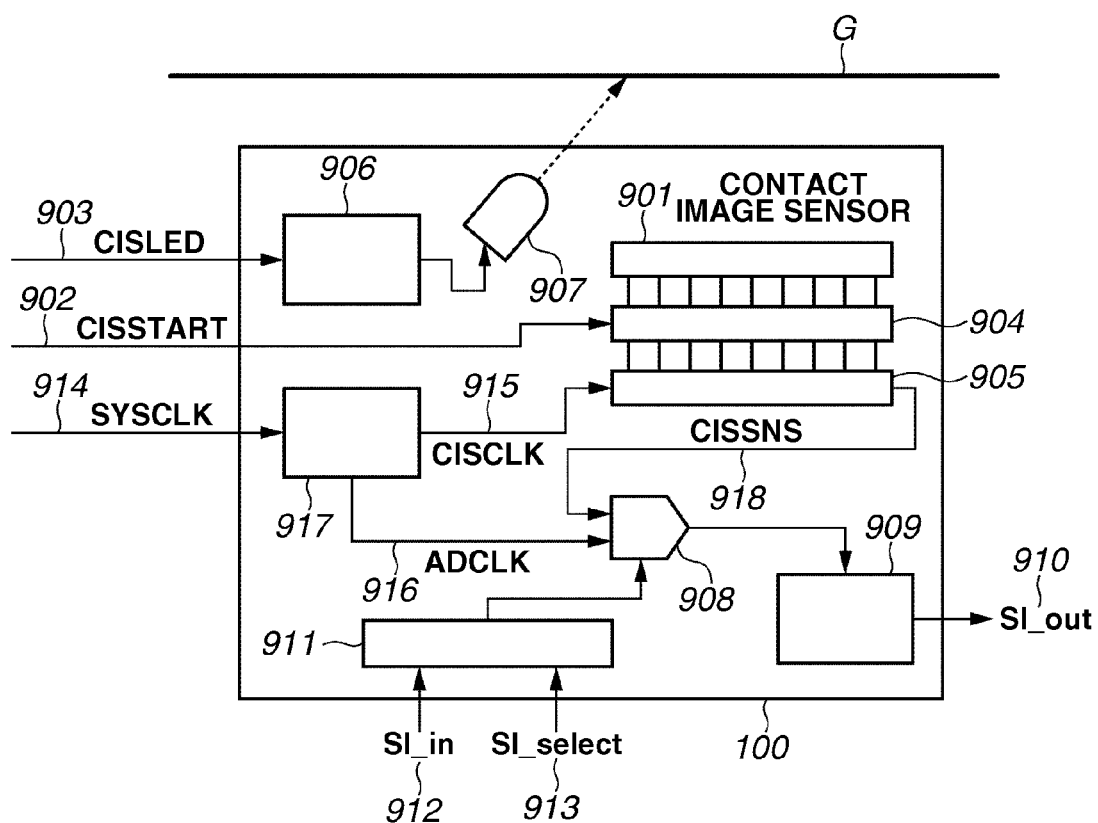
FIG. 9 is a block diagram illustrating details of an image reading unit of the image forming apparatus according to an exemplary embodiment.

FIG. 9 is a block diagram illustrating details of the image reading unit 100. FIG. 9 illustrates a circuit block of a CIS. In the CIS 901, for example, photodiodes for 10368 pixels are arranged in array form at a specific main scanning density (such as 1200 dpi).

The image reading unit 100 receives a start pulse signal (CISSTART) 902, a light emitting element control signal (CISLED) 903, an $S1_{13}$ in signal 912, an $S1_{13}$ select signal 913, and a system clock (SYSCLK) 914 that determines the operation speed of the CIS. In addition, the image reading unit 100 transmits an $S1_{13}$ out signal 910.

The light emitting element 907 emits light based on the electric current amplified by a current amplification unit 906, and equally irradiates the document G therewith.

When the CISSTART signal 902 becomes active, the contact image sensor 901 starts storing the electric charge based on the received light, and set the data to an output buffer 904 sequentially. Next, when a transfer clock (CISCLK) 915 (at 500 kHz to 1 MHz, for example) is supplied thereto, a shift register 905 transfers the data set to the output buffer 904 to an analog-digital (A/D) converter 908 as a CISSNS signal 918.

The CISSNS signal 918 is provided with a predetermined data security region. Therefore, after a predetermined period of time has passed from a rise timing of the transfer clock 915, the CISSNS signal 918 has to be sampled. The CISSNS signal 918 is output in synchronization with both a rising edge and a falling edge of the transfer clock 915. Frequency of a CIS sampling clock (ADCLK) 916 for determining the sampling speed of the A/D converter 908 is generated in such a manner that the frequency thereof becomes twice as large as that of the transfer clock 915. Then, the CISSNS signal 918 is sampled at the rising edge of the CIS sampling clock 916. A timing generator 917 divides the system clock 914 and generates the CIS sampling clock 916 and the transfer clock 915. A phase of the CIS sampling clock 916 is delayed for the data security region in comparison to that of the transfer clock 915.

The CISSNS signal 918 digitally converted by the A/D converter 908 is transmitted as the $S1_{13}$ out signal 910 at a predetermined timing by an output interface circuit 909. The $S1_{13}$ out signal 910 is serial data. At this time, the CISSNS signal 918 for predetermined number of pixels from the CISSTART signal 902 is analog output reference voltage and is not used as an effective pixel.

According to the $S1_{13}$ in signal 912 and the $S1_{13}$ select signal 913, a control circuit 911 can variably control A/D conversion gain of the A/D converter 908. For example, in a case where contrast of an imaged image cannot be obtained properly, the CPU 801 increases the A/D conversion gain of the A/D converter 908 to increase the contrast. With this, the image can be imaged at the most suitable contrast.

As described above, in the image forming apparatus 1 according to the present exemplary embodiment, a part of the conveyance path for conveying the document and a part of the conveyance path for executing two-sided printing are common to each other. With this, the miniaturization of the image forming apparatus 1 is realized.

Then, the image forming apparatus 1 starts image forming operations in a case where the image forming apparatus 1 receives a copy instruction from the operation unit 805, or a print command from the host computer.

When the image forming apparatus 1 receives a one-sided print command from the host computer, the CPU 801 executes the image forming operation described with reference to FIG. 1.

Further, when the image forming apparatus 1 receives a two-sided print command from the host computer, the CPU 801 executes the image forming operation described with reference to FIGS. 1 and 2.

Furthermore, when the image forming apparatus 1 receives an instruction for copying the images of a two-sided document onto both sides of a recording paper from the operation unit 805, the CPU 801 executes the image forming operations described with reference to FIGS. 3 through 7.

Although detailed descriptions are not given in the above, the image forming apparatus 1 can also execute an image forming operation of reading and printing an image of the one-sided document onto one side of the recording paper, an image forming operation of reading and printing an image of the one-sided document onto both sides of the recording paper, and an image forming operation of reading and printing images of the two-sided document onto one side of the recording paper.

In addition to the above described image forming operations, the image forming apparatus 1 according to the present exemplary embodiment can perform an image forming operation of feeding and conveying the document from the second paper feeding unit 90, and printing the image based on the image information on that document. The image information used in the above image forming operation may be the image information received from the host computer via the network, or the image information previously stored in the image memory 804. A user specifies the image information stored in the image memory 804 and inputs an instruction for printing the image based on that image information on the document, through the operation unit 805 or the host computer. The CPU 801 receives these instructions from either the operation unit 805 or the host computer and executes the image forming operation for printing the image based on the image information stored in the image memory 804 on the document.

Figure 15:
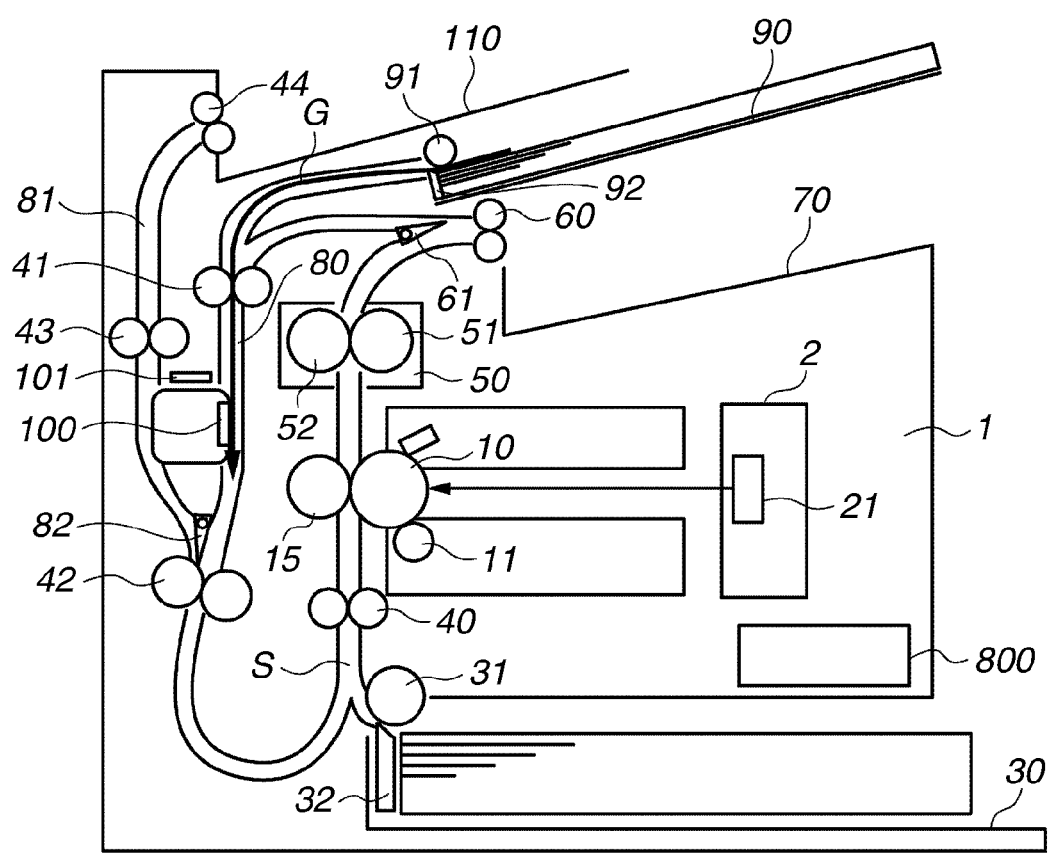
FIG. 15 is a diagram illustrating processing for printing an image based on image information on a document in the image forming apparatus according to an exemplary embodiment.
Figure 16:
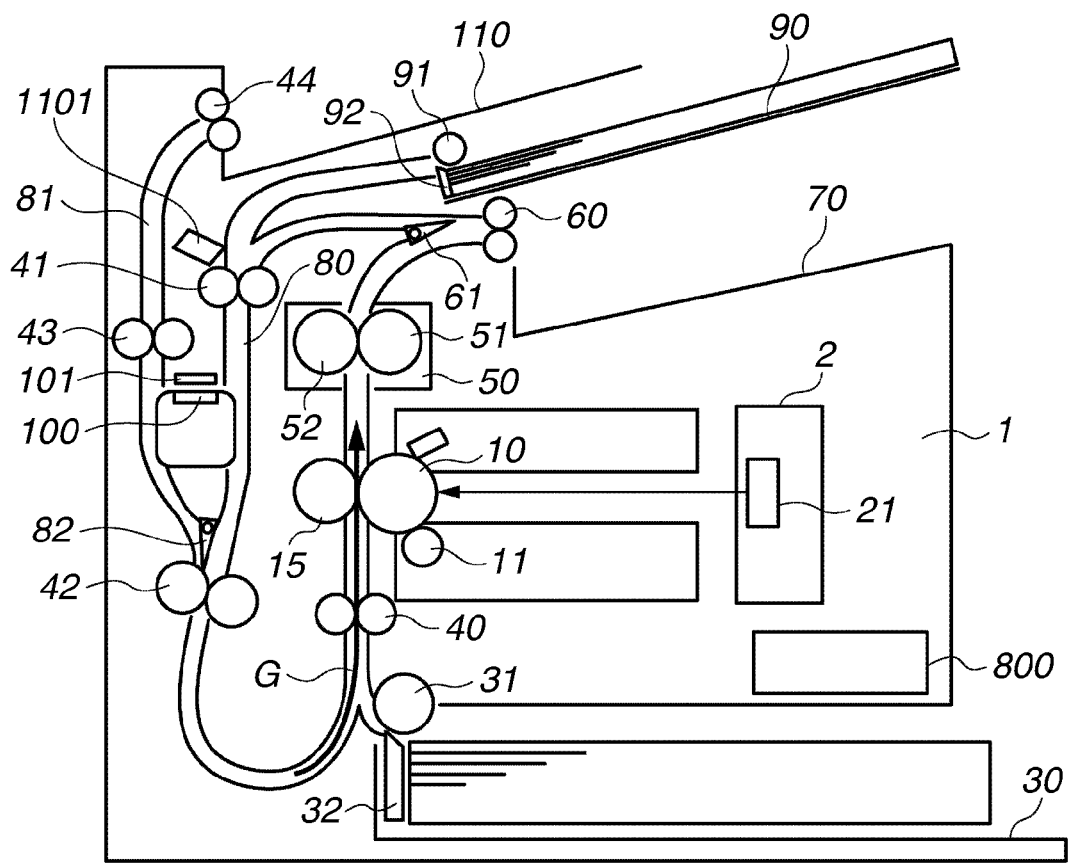
FIG. 16 is a diagram illustrating processing for printing an image based on image information on a document in the image forming apparatus according to an exemplary embodiment.

FIGS. 15 and 16 are diagrams illustrating processing for printing the image based on the image information on the document.

In FIG. 15, an arrow in a bold line indicates the document G. The document G stored in the second paper feeding unit 90 is conveyed one-by-one to the conveyance roller 41 by the CIS pickup roller 91 and the separation unit 92. The media sensor 1101 for detecting a paper type is disposed on the front side of the conveyance roller 41, so that the media sensor 1101 detects a paper type of the document conveyed thereto. A known technique may be employed for the media sensor 1101 to detect the paper type. The image reading unit 100 emits light to the white reference member 101 to correct a white reference value before start of reading the first side of the document G. Then, the image reading unit 100 rotates to the position facing the two-sided conveyance path 80. The conveyance roller 41 conveys the document G to the image reading unit 100. The image reading unit 100, that is ready at the position facing the two-sided conveyance path 80, reads the first side of the document G, and the read image information is stored in the image memory 804 as the image information of the first side of the document G.

After the image reading unit 100 reads the image on the first side of the document G, as illustrated in FIG. 16, the document G is conveyed to the transfer unit 15 by the conveyance roller 42 and the conveyance roller 40. Almost at the same time, based on the image information stored in the image memory 804, the light emitting unit 21 irradiates the surface of the photosensitive drum 10 with laser light, and a latent image based on the image information is formed on the surface of the photosensitive drum 10. The transfer unit 15 transfers a toner image formed by the latent image on the document G, and the fixing unit 50 fixes the toner image to the document G. Thereafter, the document G is stacked on the first paper discharge unit 70.

Hereinafter, units relating to printing processing such as the photosensitive drum 10, the developing roller 11, the transfer unit 15, and the fixing unit 50 are collectively referred to as "printing unit".

Figure 10:
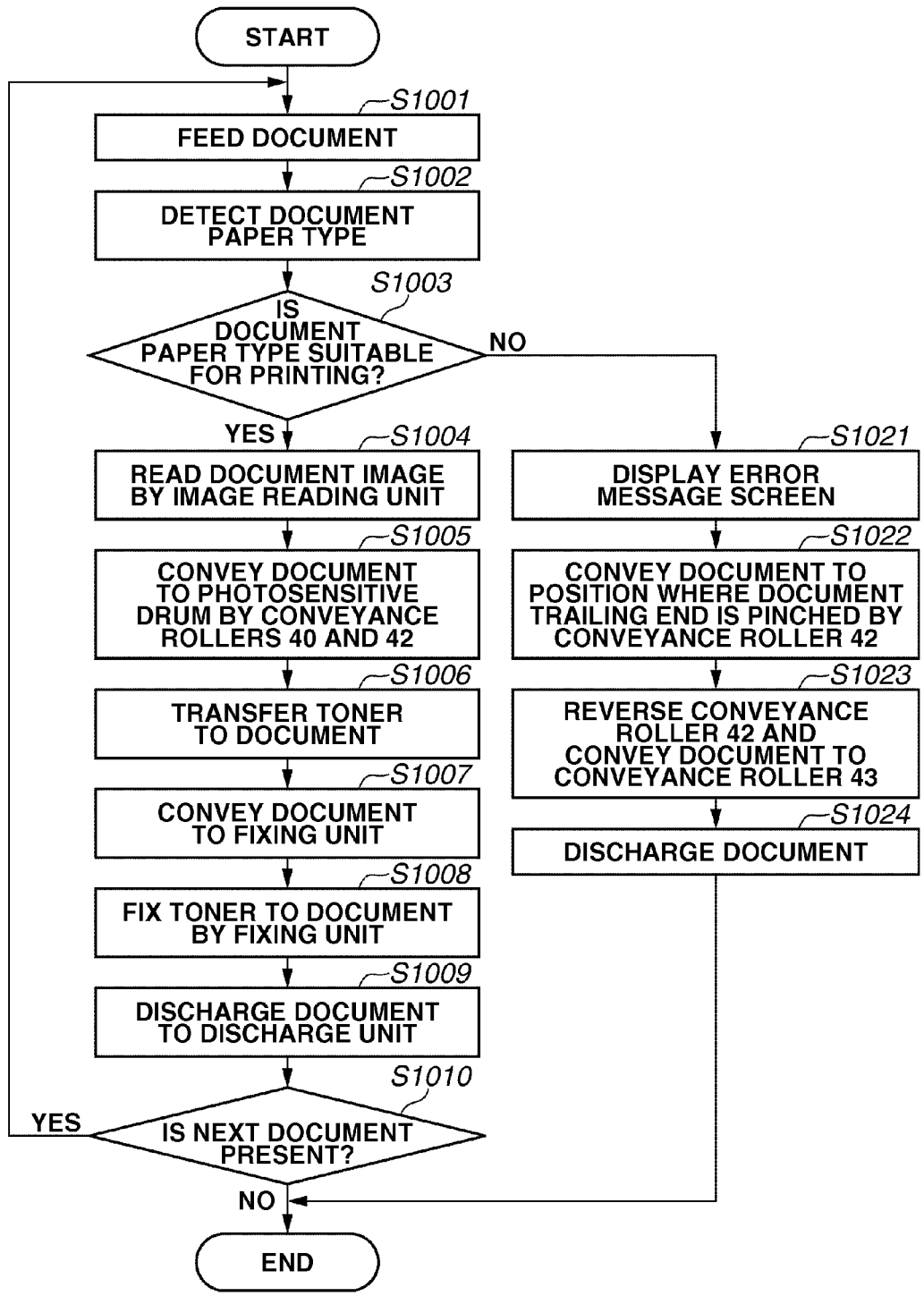
FIG. 10 is a flowchart illustrating processing executed by an image forming apparatus of the image forming apparatus according to an exemplary embodiment.

FIG. 10 is a flowchart illustrating the processing executed by the image forming apparatus 1 according to the present exemplary embodiment. The processing illustrated in the flowchart is performed by the CPU 801 executing a program stored in the program memory 803.

In a case where the CPU 801 receives an execution instruction of document printing processing in which a document image is read and other image is printed on that document, the CPU 801 starts the processing illustrated in the flowchart of FIG. 10.

In step S1001, if the CPU 801 receives an instruction for feeding a document, the CPU 801 drives the two-sided driving motor 840 and causes the CIS pickup roller 91 and the separation unit 92 to feed a sheet of document from the second paper feeding unit 90.

In step S1002, the CPU 801 detects a paper type of the fed document through a signal from the media sensor 1101. A known technique may be employed for the media sensor 1101 to detect the paper type.

In step S1003, the CPU 801 determines whether the paper type of the document is suitable for printing, by the media sensor 1101. A plain paper and a thin paper can be given as examples of the paper types suitable for printing. On the other hand, a thermal paper is an example of the paper type that is not suitable for printing. The thermal paper has a characteristic of changing in shade due to heat. Therefore, when the thermal paper is fed to the fixing unit 50, the thermal paper is changed in shade, and the content of the document will be lost. The information indicating the paper type suitable for printing and the information indicating the paper type unsuitable for printing are stored in the program memory 803, and the CPU 801 refers to the information thereof.

In step S1003, in a case where the CPU 801 determines that the paper type of the document is suitable for printing (YES in step S1003), the CPU 801 proceeds to processing in step S1004. On the other hand, in a case where the CPU 801 determines that the paper type is not suitable for printing (NO in step S1003), the CPU 801 proceeds to processing in step S1021.

In step S1004, the CPU 801 drives the two-sided driving motor 840, conveys the document to the image reading unit 100, and causes the image reading unit 100 to read the document image. The CPU 801 stores the image data indicating the image read by the image reading unit 100 in the image memory 804. Thereafter, the image data stored in the image memory 804 is printed, or transmitted to the external host computer.

In step S1005, the CPU 801 drives the two-sided driving motor 840, causes the main motor 830 and the two-sided driving motor 840 to rotate the conveyance roller 42 and the conveyance roller 40, and conveys the document to the photosensitive drum 10.

In step S1006, the CPU 801 rotates the photosensitive drum 10 by the main motor 830, and transfers toner to the document.

In step S1007, the CPU 801 conveys the document to which the toner has been transferred to the fixing unit 50 by the conveyance roller 40. The CPU 801 transfers the image according to the image data stored in the image memory 804 to be printed on the document. This image data may be stored data received from the host computer, or stored data previously read by the image reading unit 100.

In step S1008, the CPU 801 fixes toner to the document by the fixing unit 50.

In step S1009, the CPU 801 rotates the discharge roller 60 by the main motor 830 and discharges the document to which the toner has been fixed to the discharge unit 70.

In step S1010, the CPU 801 determines whether the document is still present in the second paper feeding unit 90 by a document presence/absence detection sensor (not illustrated) disposed on the second paper feeding unit 90. In a case where the CPU 801 determines that the document is still present in the second paper feeding unit 90 (YES in step S1010), the CPU 801 proceeds to processing in step S1001 and feeds the next document. On the other hand, in a case where the CPU 801 determines that the document is not present in the second paper feeding unit 90 (NO in step S1010), the CPU 801 ends the processing.

In a case where the CPU 801 determines in step S1003 that the paper type of the document is not suitable for printing and proceeds to processing in step S1021 from step S1003, in step S1021, the CPU 801 displays an error message screen illustrated in FIG. 11 on the operation unit 805.

Then, in step S1022, the CPU 801 rotates the conveyance roller 41 and the conveyance roller 42 by the two-sided driving motor 840, and conveys the document to a position where the trailing end of the document is pinched by the conveyance roller 42. A sensor disposed on the front side of the conveyance roller 42 detects that the document has been conveyed to the position where the trailing end thereof is pinched by the conveyance roller 42. Further, in a case where the CPU 801 proceeds to the processing in step S1021 from step S1003, the CPU 801 may control the image reading unit 100 to read or not to read the document image. Furthermore, the CPU 801 may previously accepts setting of whether to read the document image by the image reading unit 100 via the operation unit 805 to control the image reading unit 100 according to that setting.

In step S1023, the CPU 801 tilts the switchback flapper 82 in the right direction in FIG. 4, causes the two-sided driving motor 840 to rotate the conveyance roller 42 in the counter-clockwise direction, and conveys the document to the conveyance roller 43 as illustrated in FIG. 5. At this time, the image reading unit 100 does not read the document image. Therefore, the CPU 801 controls the orientation of the lens of the image reading unit 100 to be either the orientation of the image reading unit 100 illustrated in FIG. 3 or the orientation of the image reading unit 100 illustrated in FIG. 2. Through this, the lens of the image reading unit 100 can be prevented from being soiled.

In step S1024, the CPU 801 rotates the conveyance roller 44 by the two-sided driving motor 840 to discharge the document to the second discharge unit 110, and ends the processing.

Through the control as described above, when an image of the document is read and an image is printed on that document, the image is prevented from being printed on the document if the paper type of that document is not suitable for printing.

A second exemplary embodiment will be described.

In the above-described first exemplary embodiment, a method for discharging the document to the exterior if the paper type of the document is determined to be unsuitable for printing has been described.

In the present exemplary embodiment, an example of printing an image on a recording material instead of printing on a document will be described. In the example, if the paper type of the document is determined to be unsuitable for printing, the document is discharged to the exterior while the image is not printed on the document. At the same time, the image that is supposed to be printed on the document is printed on the recording material fed from the first paper feeding unit 30.

The configurations described with reference to FIGS. 1 through 9 are the same as in the first exemplary embodiment, and thus the detailed descriptions thereof will be omitted.

Figure 12:
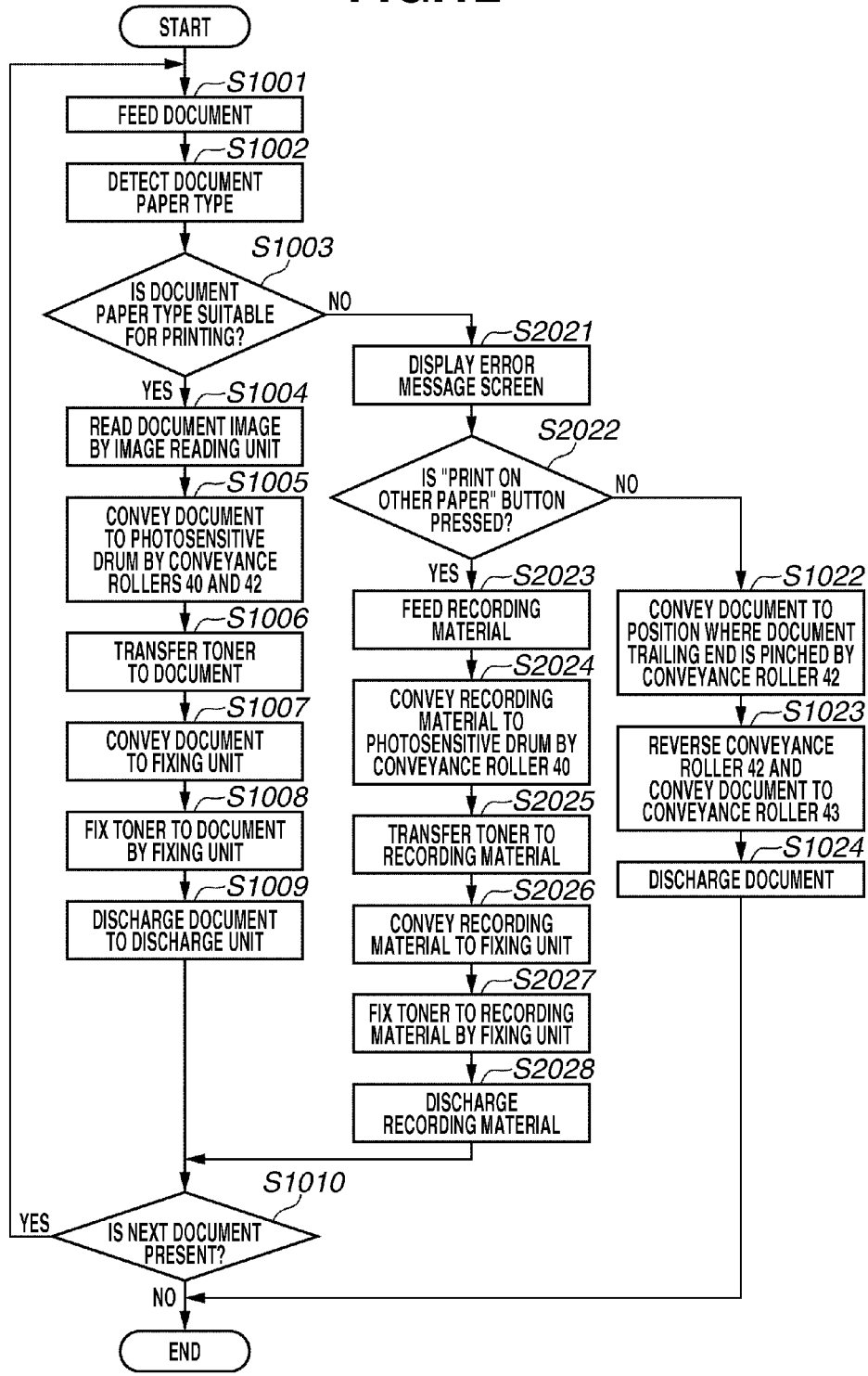
FIG. 12 is a flowchart illustrating processing executed by an image forming apparatus of the image forming apparatus according to an exemplary embodiment.

FIG. 12 is a flowchart illustrating the processing executed by the image processing apparatus 1 according to the present exemplary embodiment. The processing illustrated in the flowchart is performed by the CPU 801 executing the program stored in the program memory 803.

The processing illustrated in FIG. 12 is started by the CPU 801 if the CPU 801 receives an execution instruction of document printing processing in which a document image is read and other image is printed on that document. The same reference numerals are assigned to the processing same as that in FIG. 10, and detailed descriptions thereof will be omitted.

In step S1003, in a case where the CPU 801 determines that the paper type of the document is not suitable for printing (NO in step S1003), the CPU 801 proceeds to processing in step S2021. At this time, the CPU 801 tentatively suspends conveyance of the document.

Figure 13:
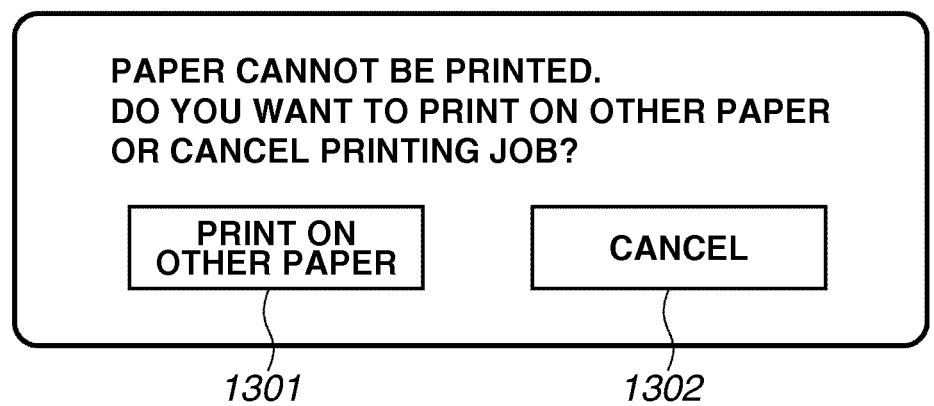
FIG. 13 is a diagram illustrating an example of a screen displayed on the operation unit of the image forming apparatus according to an exemplary embodiment.

In step S2021, the CPU 801 displays an error message screen illustrated in FIG. 13 on the operation unit 805. In the error message screen of FIG. 13, a message indicating that the printing cannot be executed, a "PRINT ON OTHER PAPER" button, and a "CANCELL" button are displayed. If the user would like to print an image that is supposed to be printed on the document, on a paper other than the document, the user presses the "PRINT ON OTHER PAPER" button. On the other hand, if the user would like to complete by ejecting the document without printing the image that is supposed to be printed on the document, on the paper other than the document, the user presses the "CANCELL" button.

In step S2022, the CPU 801 determines whether the "PRINT ON OTHER PAPER" button is selected and accepted.

In a case where the CPU 801 determines that the "PRINT ON OTHER PAPER" button is selected and accepted (YES in step S2022), the CPU 801 proceeds to processing in step S2023. In step S2023, the CPU 801 drives the main motor 830 and feeds a sheet of recording material from the first paper feeding unit 30 by the CST pickup roller 31 and the separation unit 32. The paper suitable for printing (for example, a plain paper) is stored in the first paper feeding unit 30 by the user in advance.

In step S2024, the CPU 801 rotates the conveyance roller 40 by the main motor 830 and conveys the fed recording material to the photosensitive drum 10.

Thereafter, in step S2025, the CPU 801 transfers toner to the recording material by the photosensitive drum 10. The CPU 801 transfers the image according to the image data stored in the image memory 804 to be printed on the document. This image data may be stored data received from the host computer, or stored data previously read by the image reading unit 100.

In step S2026, the CPU 801 conveys the recording material to which the toner has been transferred to the fixing unit 50 by the conveyance roller 40.

In step S2027, the CPU 801 fixes the toner to the recording material by the fixing unit 50.

In step S2028, the CPU 801 rotates the discharge roller 60 by the main motor 830 to discharge the recording material to which the toner has been fixed to the discharge unit 70. Then, the CPU 801 proceeds to processing in step S1010.

Further, in parallel with the processing in steps S2023 through S2027, the CPU 801 conveys the document through the pathway illustrated in FIGS. 3 through 7. Thereafter, the CPU 801 discharges the document conveyed through the pathway illustrated in FIGS. 3 through 7 to the second paper discharge unit 110. Then, the CPU 801 proceeds to processing in step S1010.

In step S1010, the CPU 801 determines whether the document is still present in the second paper feeding unit 90 by the document presence/absence detection sensor (not illustrated) disposed on the second paper feeding unit 90. In a case where the CPU 801 determines that the document is still present in the second paper feeding unit 90 (YES in step S1010), the CPU 801 proceeds to processing in step S1001, and feeds the next document. On the other hand, in a case where the CPU 801 determines that the document is not present in the second paper feeding unit 90 (NO in step S1010), the CPU 801 ends the processing.

In a case where the CPU 801 determines that the "PRINT ON OTHER PAPER" button is selected and accepted in the error message screen of FIG. 13 displayed in step S2021, the CPU 801 may control as follows. The CPU 801 may drive the two-sided driving motor 840, conveys the document to the image reading unit 100, and causes the image reading unit 100 to read the document image. Then, the CPU 801 may record the document image read by the image reading unit 100 onto the recording material fed in step S2023. With this, the CPU 801 can print the content of the document on a plain paper. The user places that plain paper on the second paper feeding unit 90 again, and instructs the CPU 801 to execute the document printing processing. Through this, the image according to the image data previously stored in the image memory 804 can be printed on a paper suitable for printing together with the document content.

Further, the CPU 801 may perform control processing in such a manner that the CPU 801 causes the image data indicating the image read by the image reading unit 100 to be stored in the image memory 804, and executes printing by synthesizing that image data with the image data to be printed, that has been stored in the image memory 804. Through this, without placing the document on the second paper feeding unit 90 again, the user can print the image according to the image data previously stored in the image memory 804 on a paper suitable for printing together with the document image.

On the other hand, in a case where the "CANCELL" button is selected and accepted on the error message screen of FIG. 13 displayed in step S2021, the CPU 801 proceeds to processing in step S1022 from step S2022.

In step S1022, the CPU 801 rotates the conveyance roller 41 and the conveyance roller 42 by the two-sided driving motor 840, and conveys the document to the position where the trailing end of the document is pinched by the conveyance roller 42. A sensor disposed on the front side of the conveyance roller 42 detects that the document has been conveyed to the position where the trailing end thereof is pinched by the conveyance roller 42. Further, in a case where the CPU 801 proceeds to the processing in step S1021 from step S1003, the CPU 801 may control the image reading unit 100 to read or not to read the document image. Furthermore, the CPU 801 may previously accepts the setting of whether to read the document image by the image reading unit 100 via the operation unit 805, and controls the image reading unit 100 according to that setting.

In step S1023, the CPU 801 tilts the switchback flapper 82 in the right direction in FIG. 4, causes the two-sided driving motor 840 to rotate the conveyance roller 42 in the counter-clockwise direction, and conveys the document to the conveyance roller 43 as illustrated in FIG. 5. At this time, the image reading unit 100 does not read the document image. Therefore, the CPU 801 controls the orientation of the lens of the image reading unit 100 to be either the orientation of the image reading unit 100 illustrated in FIG. 3 or the orientation of the image reading unit 100 illustrated in FIG. 2. Through this, the lens of the image reading unit 100 can be prevented from being soiled.

In step S1024, the CPU 801 rotates the conveyance roller 44 by the two-sided driving motor 840 to discharge the document to the second discharge unit 110, and ends the processing.

Through the control as described above, when an image of the document is read and an image is printed on that document, the image is prevented from being printed on the document if the paper type of that document is not suitable for printing.

In addition, in a case where the CPU 801 determines in step S1003 that the paper type of the document is not suitable for printing, the CPU 801 may set or change whether to perform the processing in step S2023 and onward steps or the processing in step S1022 and onward steps, before the CPU 801 starts the document printing processing. The CPU 801 stores that setting in the program memory 803, and in a case where the CPU 801 determines that the paper type of the document is not suitable for printing, the CPU 801 refers to the program memory 803 and executes the processing in step S2023 and onward steps if the setting for printing other paper has been made. On the contrary, if the CPU 801 determines that the paper type of the document is not suitable for printing, the CPU 801 refers to the program memory 803 and executes the processing in step S1022 and onward steps if the setting for cancelling the document printing processing has been made. Accordingly, when the CPU 801 determines that the paper type of the document is not suitable for printing, the CPU 801 does not have to suspend printing and conveyance processing of the document.

Other Embodiments

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the references to exemplary embodiments have been provided, it is to be understood that these embodiments are not limiting. The scope of the following claims is to be accorded the broadest interpretation so as to encompass all modifications, equivalent structures, and functions.

This application claims priority from Japanese Patent Application No. 2012-106119 filed May 7, 2012, which is hereby incorporated by reference herein in its entirety.

What is claimed is:

1. An image forming apparatus having a first sheet holding unit and a second sheet holding unit, the image forming apparatus comprising:

a reading unit configured to read a first image on a sheet fed from the second sheet holding unit, and generate image data corresponding to the first image;

storing unit configured to store the image data generated by the reading unit in a memory;

a detecting unit configured to detect a sheet type of sheet fed from the second sheet holding unit;

a printing unit configured to print a second image onto a sheet fed from the first sheet holding unit or a sheet fed from the second sheet holding unit; and a control unit configured to, when the printing unit is to print the second image onto a sheet fed from the second sheet holding unit, allow the printing unit to print the second image onto a sheet fed from the second sheet holding unit in a case where the sheet type detected by the detecting unit is a first sheet type, and restrict the printing unit from printing the second image onto a sheet fed from the second sheet holding unit in a case where the sheet type detected by the detecting unit is a second sheet type, wherein, when the printing unit is to print the second image onto a sheet fed from the first sheet holding unit, a sheet type of a sheet fed from the first sheet holding unit is not detected by the detecting unit before the printing unit prints the second image thereon.

2. The image forming apparatus according to claim 1, wherein, in a case where the sheet type detected by the detecting unit is the second sheet type, the control unit causes the fed sheet to be discharged without the second image being printed thereon.

3. The image forming apparatus according to claim 1, wherein, in a case where the sheet type detected by the detecting unit is the second sheet type, the control unit controls the printing unit to print the second image on a sheet fed from the first sheet holding unit.

4. The image forming apparatus according to claim 1, further comprising a receiving unit configured, in a case where the sheet type detected by the detecting unit is the second sheet type, to receive a selection whether to print the second image on another sheet.

5. The image forming apparatus according to claim 1, wherein the second sheet type is a thermal paper.

6. The image forming apparatus according to claim 1, wherein the detecting unit is a media sensor.

7. The image forming apparatus according to claim 1, further comprising a sending unit configured to send the image data stored in the memory.

8. The image forming apparatus according to claim 1, wherein the printing unit is further configured to print the first image based on the image data stored in the memory.

9. A control method for controlling an image forming apparatus having a first sheet holding unit and a second sheet holding unit, the control method comprising:

reading a first image on a sheet fed from the second sheet holding unit and generating image data corresponding to the first image;

storing the generated image data in a memory;

detecting a sheet type of a sheet fed from the second sheet holding unit;

printing a second image onto a sheet fed from the first sheet holding unit or a sheet fed from the second sheet holding unit; and when the second image is to be printed onto a sheet fed from the second sheet holding unit, allowing the second image to be printed onto a sheet fed from the second sheet holding unit in a case where the detected sheet type is a first sheet type, and restricting the second image from being printed onto a sheet fed from the second sheet holding unit in a case where the detected sheet type is a second sheet type wherein, when the second image is to be printed onto a sheet fed from the first sheet holding unit, a sheet type of a sheet fed from the first sheet holding unit is not detected before the second image is printed thereon.

10. A non-transitory computer readable storage medium storing a computer program for controlling an image forming apparatus having a first sheet holding unit and a second sheet holding unit, the computer program comprising:

code to read a first image on a sheet fed from the second sheet holding unit and generate image data corresponding to the first image;

code to store the generated image data in a memory;

code to detect a sheet type of a sheet fed from the second sheet holding unit;

code to print a second image onto a sheet fed from the first sheet holding unit or a sheet fed from the second sheet holding unit; and when the second image is to be printed onto a sheet fed from the second sheet holding unit, code to allow the second image to be printed onto a sheet fed from the second sheet holding unit in a case where the detected sheet type is a first sheet type, and restrict the second image from being printed onto a sheet fed from the second sheet holding unit in a case where the detected sheet type is a second sheet type wherein, when the second image is to be printed onto a sheet fed from the first sheet holding unit, a sheet type of a sheet fed from the first sheet holding unit is not detected before the second image is printed thereon.

* * * * *